Figure 1:
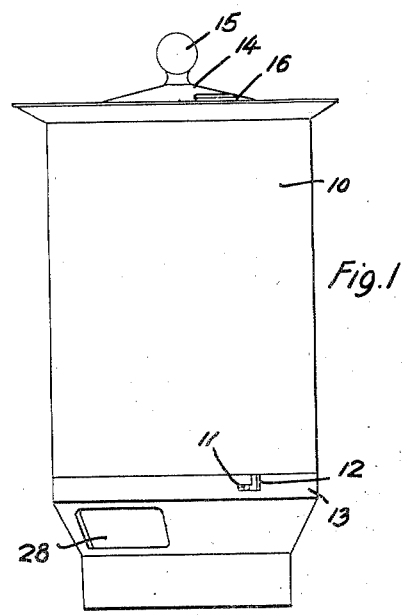

May 30, 1950  C. J. APABLASA  2,509,795
PRECIOUS METAL TRAP
Filed June 27, 1946

Inventor
Cayetano J. Apablasa,
By
Attorney

Patented May 30, 1950

2,509,795

UNITED STATES PATENT OFFICE 2,509,795

PRECIOUS METAL TRAP

Cayetano J. Apablasa, Los Angeles, Calif.

Application June 27, 1946, Serial No. 679,603

10 Claims. (Cl. 210—57)

This invention is a precious metal trap for use in conjunction with dental cuspidors.

An object of the invention is to provide a precious metal recovery device of simple and inexpensive construction and which may be used as an independent unit in connection with a standard type of dental cuspidor so as to operate in association therewith.

A further object of the invention is to provide a precious metal trap so constructed and equipped as to collect from liquids passing therethrough, all precious metals and materials and to retain the same after the liquids have been drained therefrom so that they may be recovered for further use.

A further object of the invention is to provide a trap of the character thus generally stated which is of extremely simple construction, which is composed of but few readily assembled parts, which has its baffling or separating elements so constructed and associated within the trap as to separate the solids from the liquids, which may be readily operated to remove the trap from the cuspidor for metal recovery purposes, which has its parts so constructed and assembled as to minimize the opportunity for breakage or derangement of the same, and which will prove highly practical and efficient in operation.

With the foregoing objects is view, together with others which will appear as the description proceeds, the invention consists in the novel construction, combination and arrangement of parts, all as will be described more fully hereinafter, illustrated in the drawing, and particularly pointed out in the claims.

Figure 2:
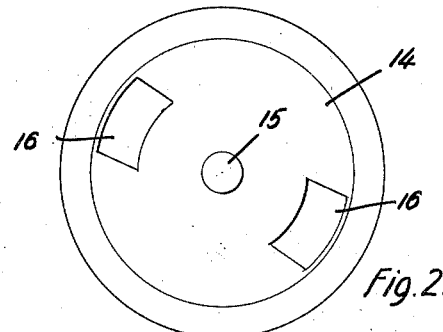
Figure 5:
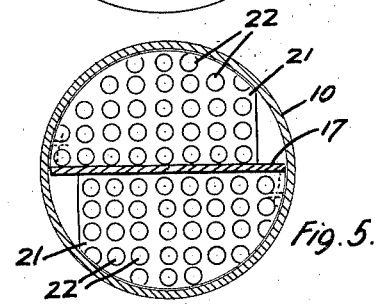
Figure 3:
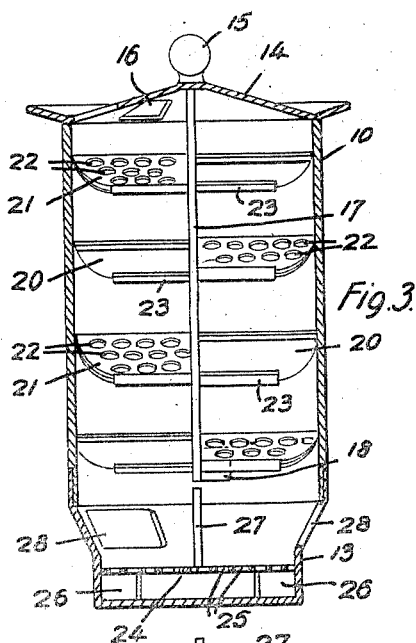
Figure 4:
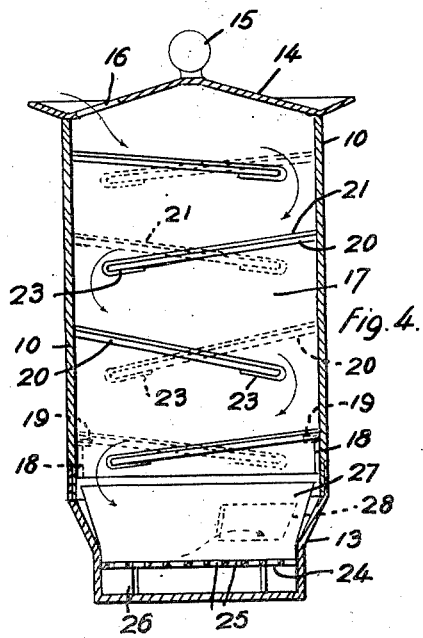
Figure 6:
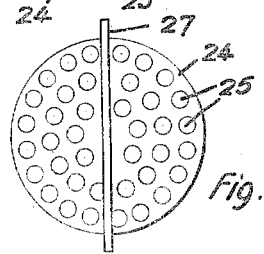

In the drawing:

Fig. 1 is a vertical elevation illustrating a precious metal trap unit constructed in accordance with the invention, Fig. 2 is a top plan view thereof, Fig. 3 is a vertical longitudinal sectional view taken through the trap and showing the baffling and partition elements in elevation, Fig. 4 is a view similar to and taken at right angles to Fig. 3, Fig. 5 is a transverse sectional view taken through the precious metal trap, and Fig. 6 is a top plan view of the false bottom for the collection chamber.

The invention here disclosed is closely related to the device of my invention disclosed by my prior Patent No. 2,083,485, dated June 8, 1937. In the patent aforesaid, reliance for the recovery of precious metals is placed upon an amalgamation chamber at the base of the trap, while in the present instance the amalgamation chamber is dispensed with and the precious metals or solids carried by the fluids passing through the trap are retained largely by the baffling elements.

In the drawing, 10 indicates a casing preferably of cylindrical form, open at both ends and having radiating from the lower portion thereof pins 11 to engage in and interlock with bayonet slots 12 in the upper edges of a frusto conical base constituting a collection chamber 13. This base is reduced in size so as to enable it to accommodate itself within a standard type dental cuspidor, as will be understood.

The upper end of the casing 10 is normally closed by a cover 14 having an upstanding grip 15 by means of which the cover may be removed from or applied to the casing. This cover is provided with inlet openings 16 through which liquids in the cuspidor may pass to the interior of the casing 10.

Depending centrally from the cover 14 is a partition element 17. This partition is disposed axially and downwardly through the casing 10 and disposed diametrically thereof, dividing the said casing into separate chambers as shown. The lower end of the partition 17 may be provided with offset lugs 18 to be engaged beneath pins 19 projecting inwardly from the walls of casing 10 whereby the partition may be locked securely in position within the casing.

Secured upon the opposite faces of partition 17 are baffles represented at 20. These baffles are rigidly secured in any approved manner to the sides of the partition upon each side thereof, and the baffles on each partition side will be disposed in staggered alternating relationship. The baffles incline in a downward direction and have their lower ends terminate in spaced relation to the adjacent portion of the casing so that liquids will flow over the lower ends of the said baffles and onto the upper surfaces of the succeeding underlying baffles, taking a zig-zag or tortuous course from the top to the bottom of the casing. Each of the baffle members 20 may include a solid strip shaped so as to snugly engage with the casing side at its upper edge and throughout the entire length of the baffle so that liquids passing into the trap must of necessity pass over the surfaces of the baffle members.

The collection elements constitute collection plates indicated at 21. These plates are of foraminous construction, and lie flat upon the upper surfaces of each of the baffle members 20. These plates are preferably of thin metal provided with spaced perforations indicated at 22, the lower end of each collection plate being bent upon itself to provide a spring finger 23 for engagement around the lower end of its baffle member for interlocking connection therewith.

The collection chamber at the lower end of the casing is provided with a false bottom represented at 24, which bottom may include a circular plate provided with spaced perforations 25. This plate rests upon and is spaced above the bottom of the chamber by upstanding fins or spacing members 26 carried by the collection chamber bottom. The false bottom 24 is also provided with an upstanding diametrically disposed fin or partition element 27, adapted to substantially align with the partition members 17 of the casing 10. The side walls of the collection chamber 13 are provided with liquid outlets represented at 28, one of which outlets communicates with the chamber upon each side of the partition 27.

In operation, the collection chamber is secured to the lower end of the casing by the pin and bayonet slot arrangement as described, whereupon the top 14 with its dependent partition and baffles is inserted and locked in position by a slight rotative movement to engage the elements 18 with the inwardly projecting pins 19. Thus assembled, the trap is placed within the outlet opening of the standard dental cuspidor. Liquids pass from the cuspidor into the casing through the openings 16. In their downward flow, the liquids strike the baffles in the two compartments and pass from one to the other in their downward movement in a zig-zag or sinuous course. Solids, such as precious metals, contacting the foraminous collector plates supported by the baffles will be collected within the openings and retained therein. Such solids as may happen to pass entirely through the baffle structure will be collected by the strainer or false bottom 24; the liquids, freed of all solids, passing from the collection chamber through the openings 28 and into the cuspidor drain.

Recovery of the solids thus retained by the trap is made by removing the trap bodily from the cuspidor drain and by detaching the several sections of the trap. It will be found that most of the solids passing into the trap will have been collected and retained within the numerous openings in the collector plates carried by the baffles 20. These collector plates may be very easily withdrawn from the baffles by withdrawing the fingers 23 from engagement with the edges thereof. When the precious metals have thus been recovered, the collector plates are again applied to the baffle members, the parts reassembled and the trap placed in the cuspidor drain for further use.

From the foregoing it is apparent that I have provided a precious metal trap of such construction as to insure recovery of all solids, however minute, passing into the trap, and without resort to the amalagamation chamber as has been heretofore contemplated.

I claim:

1. A precious metal trap comprising a casing having an inlet at one end and an outlet at the other, a plurality of baffles in said casing disposed in positions to be engaged by and to retard the flow of liquid passing through the casing, and a collector plate secured to each of said baffles and covering the latter, each collector plate having openings extending entirely through the same.

2. A precious metal trap comprising a casing having an inlet at one end and an outlet at the other, a plurality of baffles in said casing disposed in positions to be engaged by and to retard the flow of liquid passing through the casing, and a collector plate removably secured to each of said baffles and covering the latter, said plates having openings therein communicating with said baffles.

3. A precious metal trap comprising a casing having an inlet at one end and an outlet at the other, a plurality of baffles in said casing disposed in positions to be engaged by and to retard the flow of liquid passing through the casing, and a collector plate removably secured to each of said baffles and disposed upon the upper face thereof, said collector plates having openings extending entirely through the same and said plates entirely covering said baffles.

4. A precious metal trap comprising a casing having an inlet at one end and an outlet at the other, a plurality of baffles in said casing disposed in positions to be engaged by and to retard the flow of liquid passing through the casing, a collector plate overlying each of said baffles, said collector plates having pockets to retain precious metals and a resilient retaining finger on each of said plates engageable over an edge of its respective baffle to hold the same rigid upon but removable from said baffle.

5. A precious metal trap comprising a cylindrical casing having an inlet opening at its upper end, a collection chamber at the lower end of said casing in communication with the latter, baffles arranged in staggered relation within said casing disposed in positions to be engaged by and to retard the flow of liquid passing through the casing, collector plates supported by and overlying each of said baffles, said collector plates having pockets therein to retain precious metal, a retriculated false bottom in said collection chamber, and an outlet for said collection chamber above said false bottom.

6. A precious metal trap comprising a cylindrical casing having an inlet opening at its upper end, a collection chamber at the lower end of said casing in communication with the latter, a partition extending axially through said casing and diametrically across the same, baffles arranged in spaced relationship on opposite sides of said partition disposed in positions to be engaged by and to retard the flow of liquid passing through the casing, collection plates secured upon said baffles, said plates having means thereon to retain precious metals, and said collection chamber having an outlet therein.

7. A precious metal trap comprising a cylindrical casing open at both ends, a cover for the upper end of said casing having inlet openings therein, a partition member carried by said cover and extending axially through said casing and diametrically across the same to divide the casing into separate passages, baffle members carried by said partition and disposed in staggered relation within each of said passages, collection plates removably secured to the upper faces of each of said baffles, means in said plates for the retention of precious metals, a collection chamber removably secured to the lower end of said casing, a false bottom removably supported within said collection chamber, a partition projecting upwardly from said false bottom and in substantial alignment with the partition supported by said cover, and said collection chamber having outlet openings in its sides disposed above said false bottom.

8. A precious metal trap comprising a cylindrical casing having an inlet at its top and an outlet at its bottom, a partition extending axially through said casing and diametrically across the same to divide the casing into separate passages, baffle members secured to said partition and disposed in staggered relation in each of said passages and disposed in positions to be engaged by and to retard the flow of liquid passing through the casing, collector plates lying flat upon said baffles and having spaced openings extending entirely through the same, and means for detachably securing said collector plates upon said baffles.

9. A precious metal trap comprising a cylindrical casing open at its upper end and having an outlet near its bottom, a cover for said casing having inlet openings therein, a partition carried by and depending from said cover and dividing said casing into separate passage, baffles secured to each side of said partition and arranged in staggered relation in said passages to be engaged by and to retard the flow of liquid passing through said passages, and a collector plate removably secured to the upper face of each of said baffles and covering the latter.

10. A precious metal trap comprising a cylindrical casing open at its upper end and having an outlet near its bottom, a cover for said casing having inlet openings therein, a partition carried by and depending from said cover and dividing said casing into separate passages, baffles secured to each side of said partition and arranged in staggered relation in said passages to be engaged by and to retard the flow of liquid passing through said passages, and a collector plate removably secured to the upper face of each of said baffles and covering the latter, each of said plates having a plurality of openings therein communicating with the underlying baffle.

CAYETANO J. APABLASA.

REFERENCES CITED

The following references are of record in the file of this patent:

UNITED STATES PATENTS

| Number | Name | Date |
| --- | --- | --- |
| 751,038 | Wollaston | Feb. 2, 1904 |
| 1,088,416 | Guilford | Feb. 24, 1914 |
| 1,265,898 | Figg | May 14, 1918 |
| 1,609,856 | Blackman | Dec. 7, 1926 |
| 1,623,728 | Hooton | Apr. 5, 1927 |
| 1,635,845 | Holford | July 12, 1927 |
| 2,083,485 | Apablasa | June 8, 1937 |
| 2,207,399 | Gaertner | July 9, 1940 |
| 2,230,386 | Pecker | Feb. 4, 1941 |